US012646752B2

(12) United States Patent
Zhang et al.

(10) Patent No.: US 12,646,752 B2

(45) Date of Patent: Jun. 2, 2026

(54) LITHIUM-ION BATTERY INCLUDING DOPED POSITIVE ELECTRODE ACTIVE MATERIAL

(71) Applicant: CONTEMPORARY AMPEREX TECHNOLOGY (HONG KONG) LIMITED, Hong Kong (CN)

(72) Inventors: Cuiping Zhang, Ningde (CN); Changlong Han, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/091,326

(22) Filed: Mar. 26, 2025

(65) Prior Publication Data

US 2025/0226444 A1 Jul. 10, 2025

Related U.S. Application Data

(63) Continuation of application No. PCT/CN2023/071865, filed on Jan. 12, 2023.

(51) Int. Cl.

*H01M 10/0567* (2010.01)
*H01M 4/525* (2010.01)
*H01M 10/0525* (2010.01)
*H01M 10/42* (2006.01)

(52) U.S. Cl.

CPC ....... *H01M 10/0567* (2013.01); *H01M 4/525* (2013.01); *H01M 10/0525* (2013.01); *H01M 10/4235* (2013.01); *H01M 2220/20* (2013.01); *H01M 2300/0037* (2013.01)

(58) Field of Classification Search

None

See application file for complete search history.

(56) References Cited

U.S. PATENT DOCUMENTS

| | | | | |
|---|---|---|---|---|
| 11,489,203 | B2 * | 11/2022 | Shin | H01M 10/0565 |
| 12,027,670 | B2 * | 7/2024 | Oh | H01M 4/625 |
| 2020/0006766 | A1 * | 1/2020 | Wu | H01M 10/0525 |
| 2020/0161650 | A1 * | 5/2020 | Park | C01G 53/82 |
| 2021/0057780 | A1 * | 2/2021 | Oh | H01M 10/0567 |

FOREIGN PATENT DOCUMENTS

| | | | | |
|---|---|---|---|---|
| CN | 102142585 A | | 8/2011 | |
| CN | 106415910 A | | 2/2017 | |
| CN | 112310480 A | | 2/2021 | |
| CN | 113678288 A | | 11/2021 | |
| CN | 114421015 A | | 4/2022 | |
| EP | 3869594 A1 | * | 8/2021 | H01M 4/131 |
| EP | 3961785 A1 | | 3/2022 | |
| IN | 202117056429 A | | 12/2021 | |
| JP | 2018125313 A | | 8/2018 | |
| JP | 2019530958 A | | 10/2019 | |
| KR | 20190065156 A | | 6/2019 | |
| KR | 20200004768 A | | 1/2020 | |
| KR | 20200036789 A | | 4/2020 | |
| KR | 20200054097 A | | 5/2020 | |
| KR | 20200059164 A | | 5/2020 | |
| KR | 20200114403 A | | 10/2020 | |
| KR | 20220053663 A | | 4/2022 | |
| KR | 20220165206 A | | 12/2022 | |

OTHER PUBLICATIONS

Seong-Ju Sim, Seung-Hwan Lee, Bong-Soo Jin, Hyun-Soo Kim. Use of carbon coating on LiNi0.8Co0.1Mn0.1O2 cathode material for enhanced, Scientific Reports, (2020) 10:11114. (Year: 2020).*

Bo Tong, Ziyu Song, Huihai Wan, Wenfang Feng, Michel Armand, Jincheng Liu, Heng Zhang, Zhibin Zhou. Sulfur-containing compounds as electrolyte additives for lithium-ion batteries, InfoMat. 2021;3:1364-1392. (Year: 2021).*

The World Intellectual Property Organization (WIPO) International Search Report and Written Opinion for PCT/CN2023/071865 Sep. 22, 2023 10 Pages (including translation).

The Korean Intellectual Property Office Notice of Final Rejection for Application No. 10-2025-7010701 May 1, 2025 11 Pages (including translation).

The Japan Patent Office (JPO) Notice of refusal for Application No. 2025-517521 Sep. 9, 2025 4 Pages (including translation).

The Korean Intellectual Property Office Written Decision on Registration for Application No. 10-2025-7010701 Nov. 3, 2025 6 Pages (including translation).

The European Patent Office (EPO) The Extended European Search Report for Application No. 23915326.5 Dec. 8, 2025 8 Pages.

The Japan Patent Office (JPO) Decision to Grant a Patent for Application No. 2025-517521 Jan. 27, 2026 8 Pages (including translation).

* cited by examiner

*Primary Examiner* — Carlos Barcena

(74) *Attorney, Agent, or Firm* — ANOVA LAW GROUP, PLLC

(57) ABSTRACT

A lithium-ion battery includes a positive electrode and an electrolyte. A positive electrode active material included in the positive electrode includes a doping element. The doping element includes at least one selected from W, Cu, Fe, V, Cr, Ti, Zr, Zn, Al, In, Ta, Y, La, Sr, Ga, Sc, Gd, Sm, Ca, Ce, Nb, Mg, B, and Mo, and a percentage of the doping element satisfies $0.01\% \leq W1\% \leq 0.5\%$. The electrolyte includes an oligomer according to formula (I), and a percentage of the oligomer satisfies $0.1\% \leq W2 \leq 10\%$ s.

14 Claims, 4 Drawing Sheets

LITHIUM-ION BATTERY INCLUDING DOPED POSITIVE ELECTRODE ACTIVE MATERIAL

CROSS-REFERENCE TO RELATED APPLICATION

This application is a continuation of International Application No. PCT/CN2023/071865, filed on Jan. 12, 2023, the entire content of which is incorporated herein by reference.

TECHNICAL FIELD

This application relates to the technical field of lithium batteries, and in particular to a lithium-ion battery, where a positive electrode active material included in the positive electrode includes 0.01-0.5 wt % of a specific doping element, and an electrolyte includes 0.1-10 wt % of an oligomer with a specific structure. This application further relates to an electric apparatus including such lithium-ion battery.

BACKGROUND

In recent years, with the continuous development of lithium-ion batteries, lithium-ion batteries have been widely used in energy storage power supply systems such as hydroelectric, thermal, wind, and solar power plants, and many other fields including electric tools, electric bicycles, electric motorcycles, electric vehicles, military equipment, and aerospace. As lithium-ion batteries are widely used, higher requirements for their energy density, rate performance, and safety performance have been proposed in this field.

To improve the structural stability and rate performance of lithium-ion batteries, the positive electrode is usually doped with doping elements such as W, Cu, Fe, V, Cr, Ti, Zr, Zn, and Al. However, these doping elements are easily dissolved in the acidic environment of the electrolyte, causing damage to the positive electrode structure or further damage to the SEI film, making the battery more prone to thermal runaway. Therefore, the positive electrode material including doping elements may seriously affect the positive electrode structure and the electrical performance and safety performance of the battery.

Thus, it is needed to provide a lithium-ion battery with high structural stability and good safety performance.

SUMMARY

This application has been made in view of the above problems, and aims to provide a lithium-ion battery that achieves structural stability by doping the positive electrode active material and has good performance in preventing thermal runaway of the battery at high temperature. To achieve the foregoing objective, a first aspect of this application provides a lithium-ion battery, including a positive electrode and an electrolyte, where a positive electrode active material included in the positive electrode includes a doping element, the doping element is at least one selected from W, Cu, Fe, V, Cr, Ti, Zr, Zn, Al, In, Ta, Y, La, Sr, Ga, Sc, Gd, Sm, Ca, Ce, Nb, Mg, B, and Mo, a percentage of the doping element is W1, based on a weight of the positive electrode active material, 0.01% W1%≤0.5%, and the electrolyte includes an oligomer according to formula (I), (I)

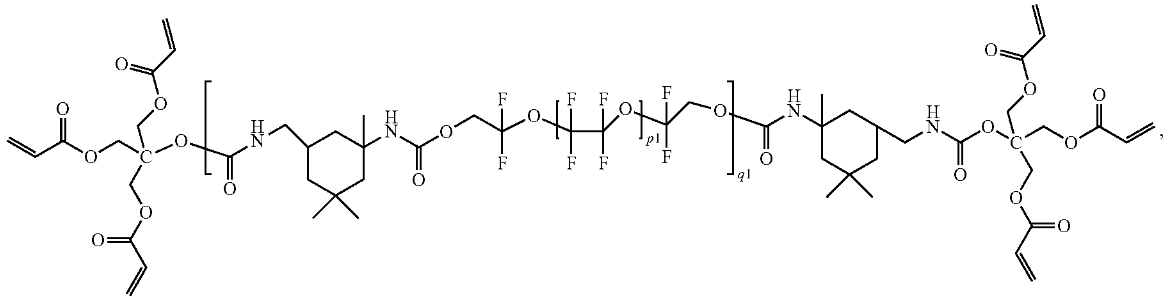

where P1 and q1 are the numbers of repeated units, P1 is an integer from 1 to 10, and q1 is an integer from 1 to 15; and a percentage of the oligomer is W2 based on a total weight of the electrolyte, and 0.1%≤W2≤10%.

In this application, the oligomer with a specific functional group is added to the electrolyte. The lone pair electrons on the amino nitrogen atoms and ether oxygen atoms in the specific functional group can combine with the proton hydrogen on hydrofluoric acid, stabilizing the hydrofluoric acid and having a certain acid-removing effect. The ester groups at both ends of the oligomer molecular structure can stabilize the doping elements at the positive electrode interface through complexation, thereby effectively inhibiting the dissolution of the doping elements and significantly reducing the risk of thermal runaway of the battery.

In any embodiment, the percentage W2 of the oligomer and the percentage W1 of the doping element satisfy 0.6≤W2/W1≤250, optionally 3≤W2/W1≤100, further optionally 5≤W2/W1≤50. When the percentage of the doping element in the positive electrode active material and the percentage of the oligomer in the electrolyte satisfy the above relationship, the dissolution of the doping element in the positive electrode material can be effectively inhibited, improving the cycling performance and safety performance of the battery.

In any embodiment, the percentage W1 of the doping element is 0.01-0.4%, optionally 0.02-0.3%. In any embodiment, the percentage W2 of the oligomer is 0.2-5%, optionally 0.3-3%.

In any embodiment, in formula (I), P1 is an integer from 2 to 8, and q1 is an integer from 2 to 10.

In any embodiment, the doping element is selected from at least one of W, Cu, Fe, V, Cr, Ti, Zr, Zn, Al, In, Ta, Y, La, Sr, Ga, Sc, Gd, Sm, Ca, Ce, Nb, Mg, B, and Mo, optionally at least one of Zr, Mg, Al, and B.

In any embodiment, the positive electrode active material includes a positive electrode active material according to the following formula: $Li_x[Ni_yCo_zMn_w]O_2$, where $0.8\leq x\leq 1.2$, $0.5\leq y<1$, $0<z\leq 0.3$, and $0<w\leq 0.3$.

In any embodiment, a solvent in the electrolyte is selected from at least one of ethylene carbonate, propylene carbonate, dimethyl carbonate, diethyl carbonate, ethyl methyl carbonate, fluoroethylene carbonate, ethyl acetate, and ethyl propionate.

In any embodiment, lithium salt in the electrolyte is selected from at least one of $LiPF_6$ and lithium bis(fluorosulfonyl)imide, optionally $LiPF_6$.

In any embodiment, the lithium-ion battery includes a negative electrode. A negative electrode active material included in the negative electrode includes at least one of natural graphite, artificial graphite, mesocarbon microbeads, hard carbon, soft carbon, silicon, silicon-carbon composite, Li—Sn alloy, Li—Sn—O alloy, Sn, SnO, $SnO_2$, spinel structure lithiated $TiO_2$—$Li_4Ti_5O_{12}$, and Li—Al alloy.

In any embodiment, the electrolyte further includes an additive selected from at least one of vinylene carbonate, ethylene sulfite, lithium difluoro(oxalato)borate, lithium difluorophosphate, lithium tetrafluoroborate, 1,3-propanesulfonate, lithium triflate, and lithium borate diacetate.

A second aspect of this application provides an electric apparatus, including the lithium-ion battery in the first aspect of this application.

BRIEF DESCRIPTION OF DRAWINGS

To describe the technical solutions in the embodiments of this application more clearly, the following briefly describes the accompanying drawings required for describing embodiments of this application. Apparently, the accompanying drawings in the following description show only some embodiments of this application, and persons of ordinary skill in the art may still derive other drawings from these accompanying drawings without creative efforts.

REFERENCE SIGNS ARE DESCRIBED AS FOLLOWS

Figure 1:
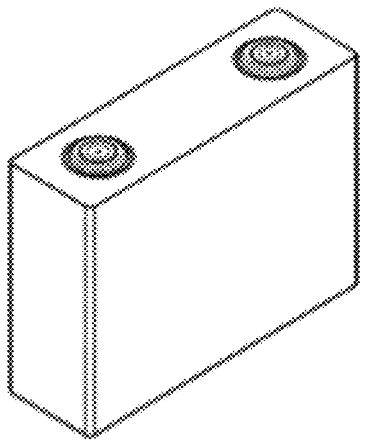
FIG. 1 is a schematic diagram of a lithium-ion secondary battery according to an embodiment of this application.

1. Battery pack
2. Upper box body
3. Lower box body
4: Battery module
5. Lithium-ion secondary battery
51. Housing
52. Electrode assembly
53. Cover plate

DESCRIPTION OF EMBODIMENTS

Hereinafter, specific embodiments of this application will be described in detail with appropriate reference to the accompanying drawings, but unnecessary detailed descriptions may be omitted. For example, detailed descriptions of well-known matters and repeated descriptions of actually identical structures have been omitted. This is to avoid unnecessarily prolonging the following descriptions, for ease of understanding by persons skilled in the art. In addition, the accompanying drawings and the following descriptions are provided for those skilled in the art to fully understand this application and are not intended to limit the subject described in the claims.

For brevity, this application specifically discloses some numerical ranges. However, any lower limit may be combined with any upper limit to form an unspecified range, and any lower limit may be combined with another lower limit to form an unspecified range, and likewise, any upper limit may be combined with any other upper limit to form an unspecified range. In addition, each individually disclosed point or individual single numerical value may itself be a lower limit or an upper limit which can be combined with any other point or individual numerical value or combined with another lower limit or upper limit to form a range not expressly recorded.

In this disclosure, unless otherwise specified, phrases like "at least one of A, B, and C" and "at least one of A, B, or C" both mean only A, only B, only C, or any combination of A, B, and C.

In the development of lithium-ion batteries, the positive electrode active material is usually doped with certain other elements to stabilize the positive electrode structure and improve the cycling performance and rate performance of the battery. However, $LiPF_6$ in the electrolyte is sensitive to water and easily hydrolyzes to produce hydrofluoric acid. $LiPF_6$ decomposes easily when heated to produce $PF_5$, which is a Lewis acid, resulting in an acidic environment in the battery. The doping element in the positive electrode material is easily dissolved from the positive electrode under the action of acid, which may damage the positive electrode structure and damage the SEI film after the doping element is deposited on the negative electrode, leading to the exposure of a fresh interface. This causes the electrolyte to undergo reduction decomposition, consuming active lithium. Additionally, the destruction of the SEI film leads to an earlier onset of thermal runaway temperature of the cell, easily causing a safety issue. Therefore, in this field, it is needed to provide a new lithium-ion battery that can improve stability by doping the positive electrode active material with a specific element and has improved performance in preventing thermal runaway of the battery.

Specifically, a first aspect of this application provides a lithium-ion battery, including a positive electrode and an electrolyte, where a positive electrode active material included in the positive electrode includes a doping element, the doping element is at least one selected from W, Cu, Fe, V, Cr, Ti, Zr, Zn, Al, In, Ta, Y, La, Sr, Ga, Sc, Gd, Sm, Ca, Ce, Nb, Mg, B, and Mo, a percentage of the doping element is W1, based on a weight of the positive electrode active material, $0.01\%\leq W1\%\leq 0.5\%$, and the electrolyte includes an oligomer according to formula (I), (I)

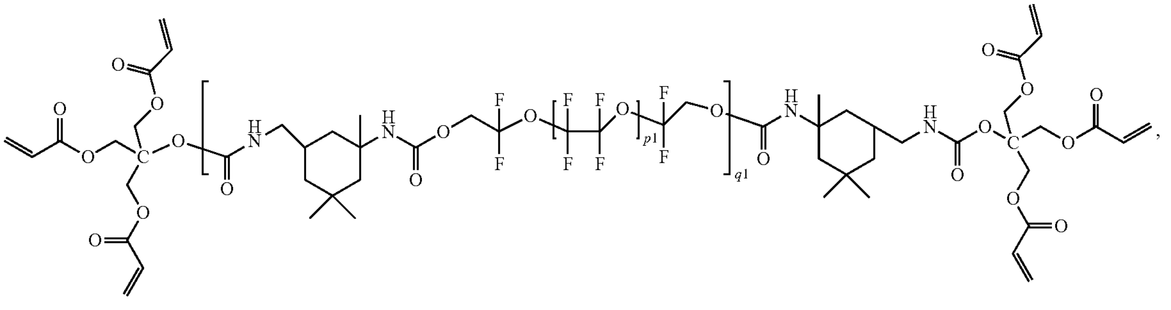

where P1 and q1 are the numbers of repeated units, P1 is an integer from 1 to 10, and q1 is an integer from 1 to 15; and a percentage of the oligomer is W2 based on a total weight of the electrolyte, and $0.1\% \leq W2 \leq 10\%$.

The inventors have found that the addition of the above oligomer with a specific functional group to the electrolyte can significantly reduce the safety risk caused by the doping element. Without being bound by any theory, the inventors believe that the lone pair electrons on the amino nitrogen atoms and ether oxygen atoms in the specific functional group can combine with the proton hydrogen on hydrofluoric acid, stabilizing the hydrofluoric acid and having a certain acid-removing effect. The ester groups at both ends of the oligomer molecular structure can stabilize the doping elements at the positive electrode interface through complexation. Thus, the addition of the oligomer effectively prevents the dissolution of the doping element from the positive electrode material, protecting the positive electrode structure and the SEI film from being damaged, thus reducing the risk of thermal runaway of the battery at high temperature.

In addition, doping the positive electrode active material as described above can improve the stability of the positive electrode material, increase the thermal decomposition temperature of the material, and improve its electrical performance. The risk caused by the doping element is avoided by adding the oligomer according to formula (I), thus achieving both the stability of the positive electrode material and the safety of the battery.

In some embodiments, the percentage W2 of the oligomer and the percentage W1 of the doping element satisfy $0.6 \leq W2/W1 \leq 250$, optionally $3 \leq W2/W1 \leq 100$, further optionally $5 \leq W2/W1 \leq 50$. When the percentage of the doping element in the positive electrode active material and the percentage of the oligomer in the electrolyte satisfy the above relationship, the dissolution of the doping element in the positive electrode material can be effectively inhibited, improving the cycling performance and safety performance of the battery. If the value of W2/W1 is too low, for example, below 0.6, the effect of the oligomer in inhibiting the dissolution of the doping element is insufficient; if the value of W2/W1 is too high, for example, above 250 or even up to 400, not only does the safety performance decrease, but the cycling performance also deteriorates.

The value of W2/W1 can be changed by altering the doping amount of the positive electrode active material and the percentage of the oligomer in the electrolyte. In some embodiments, the percentage W1 of the doping element is 0.01-0.4%, optionally 0.02-0.3%. The doping element is selected from at least one of W, Cu, Fe, V, Cr, Ti, Zr, Zn, Al, In, Ta, Y, La, Sr, Ga, Sc, Gd, Sm, Ca, Ce, Nb, Mg, B, and Mo. In some embodiments, the doping element is selected from at least one of Mg, Al, Zr, and B, optionally from at least one of Zr, Al, and B. For the doping of the positive electrode active material, precursor powder of the positive electrode active material can be mixed with a salt solution of the doping element, subjected to a liquid phase diffusion reaction, and then dried to obtain doped precursor powder. The salt solution of the doping element is a soluble metal solution containing the doping element. The solute is a salt of the doping element, such as one or more of zinc sulfate, magnesium sulfate, aluminum chloride, or zirconium nitrate; the solvent is an organic polar solvent, such as ethanol, methanol, or propanol, in some embodiments ethanol. The salt solution of the doping element can be prepared by mixing the above solute and solvent, with a concentration of 0.5-5 mol/L. The precursor powder is then mixed with the salt solution of the doping element and subjected to the liquid phase diffusion reaction, with the solid content percentage of the mixture being 30%-50%, through which the doping element uniformly infiltrates into the voids of the nickel-cobalt-manganese material via the solution. The specific process condition for the liquid phase diffusion reaction can be selected and adjusted as needed, for example, by setting the reaction temperature, reaction time, and stirring speed. An exemplary process condition for the liquid phase diffusion reaction is a reaction temperature of 25-40° C., a reaction time of 30-90 min, and a stirring speed of 15-45 Hz. The doped precursor powder obtained in this way can be further processed by steps, for example, sintering and crushing, to obtain the doped positive electrode active material.

In some embodiments, the percentage W2 of the oligomer is 0.2-5%, optionally 0.3-3%. The oligomer may be added to a non-aqueous organic solvent of the electrolyte and mixed to uniformity. In some embodiments, in formula (I), P1 is an integer from 2 to 8, and q1 is an integer from 2 to 10. A weight-average molecular weight Mw of the oligomer according to formula (I) may be 1000 g/mol to 100000 g/mol, optionally 2000 g/mol to 20000 g/mol, further optionally 3000 g/mol to 10000 g/mol. The weight-average molecular weight Mw may be measured by gel permeation chromatography (GPC), with tetrahydrofuran used as the solvent, based on standard polystyrene conversion values.

The positive electrode active material may be selected from any suitable material in the field of lithium-ion batteries, such as a ternary positive electrode material or a lithium iron phosphate material. In some embodiments, such positive electrode active material is a positive electrode active material according to the following formula: $Li_x[Ni_yCo_zMn_w]O_2$, where $0.8 \leq x \leq 1.2$, $0.5 \leq y < 1$, $0 < z \leq 0.3$, and $0 < w \leq 0.3$; optionally, in the formula, $0.05 \leq z \leq 0.2$ and $0.05 \leq w \leq 0.2$. The positive electrode active material may be doped using the above method, resulting in a doped positive electrode active material. The doping element is selected from at least one of W, Cu, Fe, V, Cr, Ti, Zr, Zn, Al, In, Ta, Y, La, Sr, Ga, Sc, Gd, Sm, Ca, Ce, Nb, Mg, B, and Mo, optionally from at least one of Mg, Al, Zr, and B, further optionally from at least one of Zr, Al, and B. The positive electrode active material may be, for example, $LiNi_{0.5}Co_{0.2}Mn_{0.3}O_2$, $Li[Ni_{0.9}Co_{0.05}Mn_{0.05}]O_2$, or $Li[Ni_{0.8}Co_{0.1}Mn_{0.1}]O_2$, but is not limited thereto.

In some embodiments, a solvent in the electrolyte is selected from at least one of ethylene carbonate, propylene carbonate, dimethyl carbonate, diethyl carbonate, ethyl methyl carbonate, fluoroethylene carbonate, ethyl acetate, and ethyl propionate. The solvent may further be a mixture of two or more of the above solvents, such as a mixture of ethylene carbonate and ethyl methyl carbonate, with a mixing weight ratio of 10:1 to 1:10, such as 3:7.

In some embodiments, lithium salt in the electrolyte is selected from at least one of $LiPF_6$ and lithium bis(fluorosulfonyl)imide, optionally $LiPF_6$. The concentration of the lithium salt in the electrolyte may be 0.5 M to 5 M, optionally 1 M to 3 M.

In some embodiments, the lithium-ion battery includes a negative electrode. A negative electrode active material included in the negative electrode includes at least one of natural graphite, artificial graphite, mesocarbon microbeads, hard carbon, soft carbon, silicon, silicon-carbon composite, Li—Sn alloy, Li—Sn—O alloy, Sn, SnO, $SnO_2$, spinel structure lithiated $TiO_2$—$Li_4Ti_5O_{12}$, and Li—Al alloy.

In some embodiments, the electrolyte further includes an additive, which can be used to prevent the decomposition of the non-aqueous electrolyte, improving the stability of the battery at high temperature, or inhibit battery swelling. In some embodiments, the additive is selected from at least one of vinylene carbonate, ethylene sulfite, lithium difluoro (oxalato)borate, lithium difluorophosphate, lithium tetrafluoroborate, 1,3-propanesulfonate, lithium triflate, and lithium borate diacetate. The additive is not necessarily required, and its percentage may be 0-5% by weight, optionally 0.5-3 wt % based on the total weight of the non-aqueous electrolyte.

A second aspect of this application provides an electric apparatus, including the lithium-ion battery in the first aspect of this application.

The materials of various components of the lithium-ion battery in this application can be chosen from a wide range. In some embodiments, the battery is particularly a lithium-ion secondary battery. A battery cell of the lithium-ion secondary battery is described in detail below.

Generally, a lithium-ion secondary battery includes a positive electrode plate, a negative electrode plate, a separator, and an electrolyte. During charging and discharging of the battery, active ions intercalate and deintercalate back and forth between the positive electrode plate and the negative electrode plate. The separator is disposed between the positive electrode plate and the negative electrode plate for isolation. An electrolyte conducts ions between the positive electrode plate and the negative electrode plate.

[Electrolyte]

The electrolyte conducts ions between the positive electrode plate and the negative electrode plate. The electrolyte includes an electrolytic salt and a solvent.

In this application, the electrolytic salt may be an electrolytic salt used commonly in the lithium-ion secondary battery, such as lithium salts, which include a lithium salt that can be used as a highly thermal-stable salt, a lithium salt that can be used as a low-resistance additive, or a lithium salt that inhibits corrosion of an aluminum foil. In an example, the electrolytic salt may be selected from more than one of lithium hexafluorophosphate ($LiPF_6$), lithium tetrafluoroborate ($LiBF_4$), lithium hexafluoroarsenate ($LiAsF_6$), lithium bis(fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium difluorophosphate ($LiPO_2F_2$), lithium difluorodioxalate phosphate (LiDFOP), lithium fluorosulfonyl imide ($LiSO_3F$), difluorodioxophosphate (NDFOP), $Li_2F(SO_2N)_2SO_2F$, KFSI, CsFSI, $Ba(FSI)_2$, and $LiFSO_2NSO_2CH_2CH_2CF_3$.

The solvent is not particularly limited in type, and may be selected based on actual needs. In some embodiments, the solvent is a non-aqueous solvent. Optionally, the solvent may include one or more of linear carbonate, cyclic carbonate, and carboxylate. In some embodiments, the solvent may be selected from more than one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetrahydrofuran, tetramethylene sulfone (SF), methyl sulfone (MSM), ethyl methyl sulfone (EMS), and ethylsulfonyl ethane (ESE).

In some embodiments, the electrolyte further optionally includes other additives. For example, the additive may include a negative electrode film-forming additive, or may include a positive electrode film-forming additive, or may include an additive that can improve some performance of a battery, for example, an additive for improving over-charge performance of the battery, an additive for improving high-temperature performance of the battery, and an additive for improving low-temperature performance of the battery. In an example, the additive is selected from at least one of cyclic carbonate compound containing unsaturated bonds, cyclic carbonate compound substituted by halogen, sulfate compound, sulfite compound, sultone compound, disulfonic compound, nitrile compound, aromatic compound, isocyanate compound, phosphonitrile compound, cyclic anhydride compound, phosphite ester compound, phosphate ester compound, borate compound, and carboxylic ester compound.

[Positive Electrode Plate]

The positive electrode plate includes a positive electrode current collector and a positive electrode active substance layer provided on at least one surface of the positive electrode current collector, where the positive electrode active substance layer includes a positive electrode active material and a conductive agent.

In an example, the positive electrode current collector has two opposite surfaces in its thickness direction, and the positive electrode active substance layer is disposed on either or both of the two opposite surfaces of the positive electrode current collector.

In the lithium-ion secondary battery of this application, the positive electrode current collector may be a metal foil or a composite current collector. For example, an aluminum foil may be used as the metal foil. The composite current collector may include a polymer material substrate and a metal layer formed on at least one surface of the polymer material substrate. The composite current collector may be formed by forming a metal material (for example, aluminum, aluminum alloy, nickel, nickel alloy, titanium, titanium alloy, silver, silver alloy, or the like) on the polymer material matrix (for example, matrices of polypropylene (PP), polyethylene terephthalate (PET), polybutylene terephthalate (PBT), polystyrene (PS), and polyethylene (PE)).

The positive electrode active substance layer provided on the surface of the positive electrode current collector includes a positive electrode active material. The positive electrode active material used in this application may include any conventional positive electrode active material used in a secondary battery. In some embodiments, the positive electrode active material may include one or more of lithium transition metal oxide, olivine-structured lithium-containing phosphate, and respective modified compounds thereof. Examples of the lithium transition metal oxide may include but are not limited to one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the olivine-structured lithium-containing phosphate may include but are not limited to one or more of lithium iron phosphate, a composite material of lithium iron phosphate and carbon, lithium manganese phosphate, a composite material of lithium manganese phosphate and carbon, lithium manganese iron phosphate, a composite material of lithium manganese iron phosphate and carbon, and modified compounds thereof. These materials are all commercially available. A surface of the positive electrode active material may be coated with carbon. The positive electrode active material may be doped to obtain a doped positive electrode active material. The doping element includes at least one selected from W, Cu, Fe, V, Cr, Ti, Zr, Zn, Al, In, Ta, Y, La, Sr, Ga, Sc, Gd, Sm, Ca, Ce, Nb, Mg, B, and Mo, but is not limited thereto.

The positive electrode active substance layer optionally includes a conductive agent. The conductive agent is not specifically limited in type, and may be selected by persons skilled in the art based on actual needs. In an example, the conductive agent for the positive electrode material may be selected from more than one of superconducting carbon, acetylene black, carbon black, Ketjen black, carbon dots, carbon nanotubes, graphene, and carbon nanofibers.

The positive electrode active substance layer further includes an aqueous binder. The aqueous binder may be selected from one or more of a soluble polysaccharide and its derivative, and a water-soluble or water-dispersible polymer. In an example, the aqueous binder may be methyl cellulose and its salts, xanthan gum and its salts, chitosan and its salts, alginic acid and its salts, polyethyleneimine and its salts, polyacrylamide, acrylic copolymers, and their derivatives.

The positive electrode plate in this application may be prepared by using the method known in the art. For example, a positive electrode active material coated with carbon, the conductive agent, and an aqueous binder are dissolved in a solvent (for example, water) to form a uniform positive electrode slurry; and the positive electrode slurry is applied on a positive electrode current collector, followed by processes such as drying and cold pressing to obtain a positive electrode plate.

[Negative Electrode Plate]

The negative electrode plate includes a negative electrode current collector and a negative electrode material layer disposed on at least one surface of the negative electrode current collector, and the negative electrode material layer includes a negative electrode active substance.

In an example, the negative electrode current collector has two back-to-back surfaces in a thickness direction thereof, and the negative electrode material layer is disposed on either or both of the two back-to-back surfaces of the negative electrode current collector.

In the lithium-ion secondary battery in this application, the negative electrode current collector may be a metal foil or a composite current collector. For example, a copper foil may be used as the metal foil. The composite current collector may include a polymer material matrix and a metal layer formed on at least one surface of the polymer material matrix. The composite current collector may be formed by forming a metal material (for example, copper, copper alloy, nickel, nickel alloy, titanium, titanium alloy, silver, and silver alloy) on the polymer material matrix (for example, matrices of polypropylene (PP), polyethylene terephthalate (PET), polybutylene terephthalate (PBT), polystyrene (PS), and polyethylene (PE)).

In the lithium-ion secondary battery in this application, the negative electrode material layer usually includes a negative electrode active substance, an optional binder, an optional conductive agent, and another optional additive, and is usually formed by being coated with a negative electrode slurry and dried. The negative electrode slurry is usually obtained by dispersing the negative electrode active substance and the optional conductive agent, the optional binder, and the like in a solvent and stirring them into a uniform mixture. The solvent may be N-methylpyrrolidone (NMP) or deionized water.

A specific type of the negative electrode active substance is not limited. An active substance known in the art that can be used as the negative electrode of the lithium-ion secondary battery, and those skilled in the art may select an active substance based on actual needs. In an example, the negative electrode active substance may be selected from one or more of graphite, soft carbon, hard carbon, mesocarbon microbeads, carbon fibers, carbon nanotubes, elemental silicon, silicon oxide compounds, silicon-carbon composites, and lithium titanate.

In an example, the conductive agent may be selected from more than one of superconducting carbon, acetylene black, carbon black, Ketjen black, carbon dots, carbon nanotubes, graphene, and carbon nanofibers.

In an example, the binder may be selected from more than one of styrene butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

For example, the another optional additive may be a thickener (for example, sodium carboxymethyl cellulose (CMC-Na)).

[Separator]

Lithium-ion secondary batteries using an electrolyte include a separator. The separator is disposed between the positive electrode plate and the negative electrode plate for isolation. The separator of this application is as described above. However, the lithium-ion battery of this application may additionally include a conventional separator. The type of the conventional separator is not limited particularly and may be any well-known porous separator with good chemical stability and mechanical stability. In some embodiments, a material of the conventional separator may be selected from more than one of glass fiber, non-woven fabric, polyethylene, polypropylene, and polyvinylidene fluoride. The separator may be a single-layer film or a multi-layer composite film, and is not particularly limited. When the separator is a multi-layer composite film, all layers may be made of same or different materials, which is not particularly limited.

In some embodiments, the positive electrode plate, the negative electrode plate, and the separator may be made into the electrode assembly through winding or lamination.

In some embodiments, the secondary battery may include an outer package. The outer package may be used for packaging the electrode assembly and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic. As the plastic, polypropylene (PP), polybutylene terephthalate (PBT), and polybutylene succinate (PBS) may be listed.

The secondary battery is not limited to a particular shape in this application, and may be cylindrical, rectangular, or of any other shapes. For example, FIG. 1 shows a lithium-ion secondary battery 5 of a rectangular structure as an example.

Figure 2:
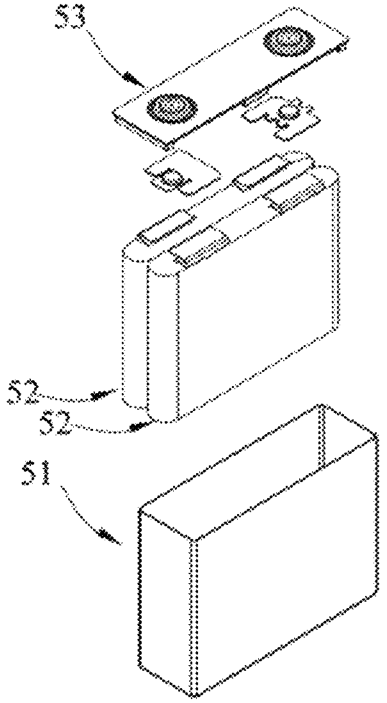
FIG. 2 is an exploded view of the lithium-ion secondary battery according to the embodiment of this application in FIG. 1.

In some embodiments, referring to FIG. 2, the outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 can cover the opening to close the accommodating cavity. The positive electrode plate, the negative electrode plate, and the separator may be made into an electrode assembly 52 through winding or lamination. The electrode assembly 52 is packaged in the accommodating cavity. The liquid electrolyte infiltrates the electrode assembly 52. There may be one or more electrode assemblies 52 in the lithium-ion secondary battery 5, and persons skilled in the art may make choices based on actual needs.

In some embodiments, lithium-ion secondary batteries may be assembled into a battery module 4, and the battery module 4 may include one or more lithium-ion secondary batteries. A specific quantity may be chosen by persons skilled in the art based on use and capacity of the battery module 4. In the battery module 4, a plurality of lithium-ion secondary batteries 5 may be sequentially arranged in a length direction of the battery module. Certainly, the batteries may alternatively be arranged in any other manner. Further, the plurality of lithium-ion secondary batteries 5 may be fixed by using fasteners. Optionally, the battery module 4 may further include a housing with an accommodating space, and the plurality of lithium-ion secondary batteries 5 are accommodated in the accommodating space.

In some embodiments, the lithium-ion secondary batteries 5 or the battery modules 4 may be assembled into a battery pack 1, and the quantity of the lithium-ion secondary batteries 5 or the battery modules 4 included in the battery pack 1 may be chosen by persons skilled in the art based on use and capacity of the battery pack 1.

The lithium-ion secondary battery in this application may include a battery cell, a battery module, or a battery pack in form. In some embodiments, the battery cells may be assembled into a battery module. In some embodiments, the foregoing battery cells may be assembled into a battery pack. In some embodiments, the foregoing battery modules may be further assembled into a battery pack.

Figure 3:
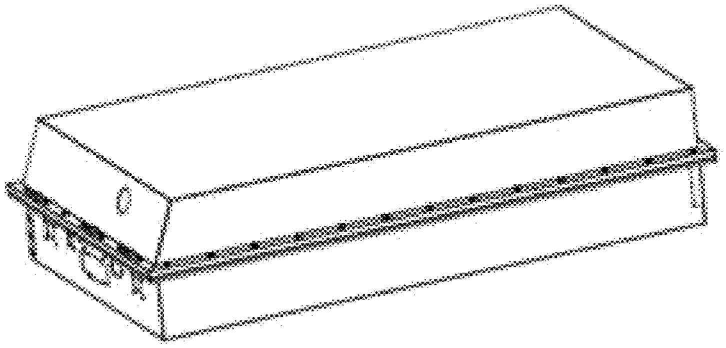
FIG. 3 is a schematic diagram of a battery pack according to an embodiment of this application.
Figure 4:
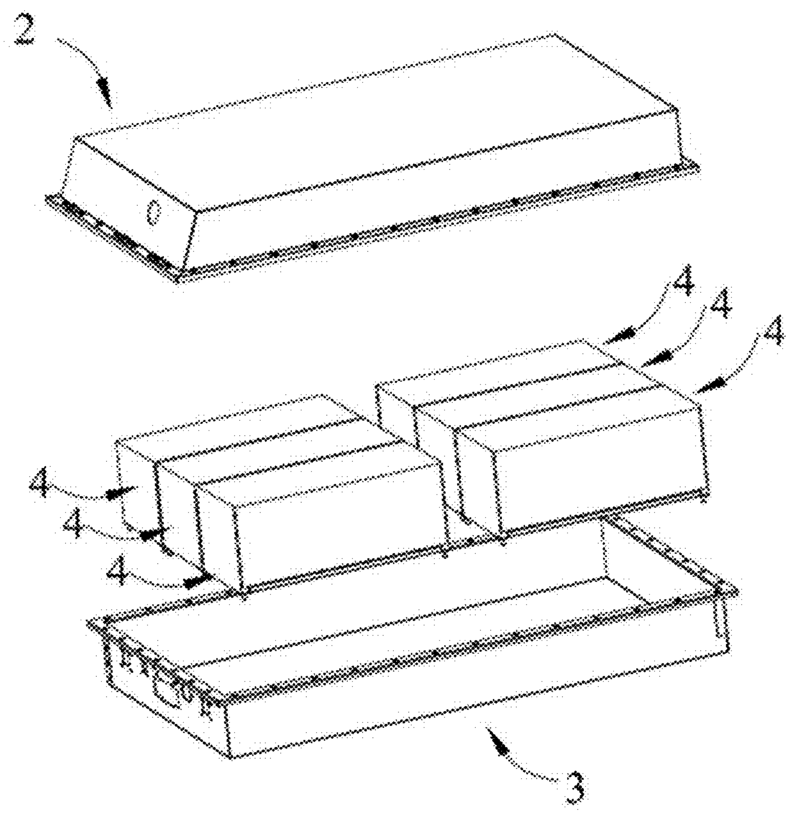
FIG. 4 is an exploded view of the battery pack according to the embodiment of this application in FIG. 3.

FIGS. 3 and 4 show a battery pack 1 as an example. Referring to FIGS. 3 and 4, the battery pack 1 may include a battery box and a plurality of battery cells in the battery box. The battery box includes an upper box body 2 and a lower box body 3. The upper box body 2 can cover the lower box body 3 to form an enclosed space for accommodating the battery cells.

In addition, this application further provides an apparatus. The apparatus includes the battery pack provided in this application. The battery pack may be used as a power source of the apparatus or an energy storage unit of the apparatus. The apparatus may be but is not limited to a mobile device (for example, a mobile phone or a laptop computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like. A battery pack may be selected for the apparatus according to requirements thereof.

Figure 5:
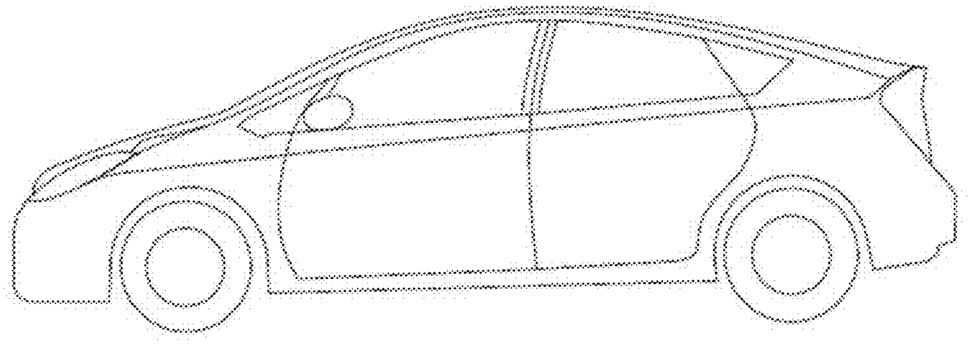
FIG. 5 is a schematic diagram of an apparatus using a battery pack as a power supply according to an embodiment of this application.

FIG. 5 shows an apparatus as an example. The apparatus is a battery electric vehicle, a hybrid electric vehicle, a plug-in hybrid electric vehicle, or the like. To meet requirements of the apparatus for high power and high energy density of lithium-ion secondary batteries, a battery pack or a battery module may be used.

EXAMPLES

The following describes examples of this application. The examples described below are illustrative and only used to explain this application, and cannot be construed as limitations on this application. Examples whose technical solutions or conditions are not specified are made in accordance with technical solutions or conditions described in literature in the field, or made in accordance with product instructions. The reagents or instruments used are all conventional products that are commercially available if no manufacturer is indicated.

Doping of Positive Electrode Material

In the examples, the positive electrode active material was doped by the following method: precursor powder of a ternary positive electrode active material was mixed with a salt solution of a doping element, subjected to a liquid phase diffusion reaction, and dried to obtain doped powder. The salt solution of the doping element was a soluble metal solution containing the doping element, where a solute was one of zinc sulfate, magnesium sulfate, aluminum chloride, or zirconium nitrate, and the solvent was ethanol. After the solute and solvent were mixed to prepare the doping element salt solution, the ternary precursor powder was mixed with the doping element salt solution and subjected to the liquid phase diffusion reaction, with a solid content percentage being 30 wt %-50 wt %, through which the doping element uniformly infiltrated into the voids of a nickel-cobalt-manganese material via the solution. A specific process condition for the liquid phase diffusion reaction was a reaction temperature of 25-40° C., a reaction time of 30-90 min, and a stirring speed of 15-45 Hz.

Example 1

(1) Preparation of Positive Electrode Plate

Powder of a ternary positive electrode material $LiNi_{0.8}Co_{0.2}Mn_{0.2}O_2$ was mixed with zirconium nitrate in a solution of ethanol and subjected to a liquid phase diffusion reaction, with a solid content percentage of the mixture being 40 wt %, through which the zirconium element uniformly infiltrated into the voids of a nickel-cobalt-manganese material via the solution. A specific process condition for the liquid phase diffusion reaction was a reaction temperature of 35° C., a reaction time of 60 min, and a stirring speed of 35 Hz.

The doped positive electrode active material (the doping element zirconium had a percentage of 0.01 wt % based on a weight of the positive electrode active material), a conductive agent Super P (conductive carbon black), and a binder polyvinylidene fluoride (PVDF) were made into a positive electrode slurry in N-methylpyrrolidone (NMP). The solid content in the positive electrode slurry was 50 wt %, and in the solid components, the mass ratio of the positive electrode active material, Super P, and PVDF was 8:1:1. The positive electrode slurry was applied to a current collector aluminum foil, and the resulting current collector was dried at 85° C. and cold pressed, followed by trimming, cutting, slitting, and drying under a vacuum condition at 85° C. for 4 h, to prepare a positive electrode plate.

Preparation of Negative Electrode Plate

A negative electrode active material graphite, a conductive agent Super P, a thickener CMC, and a binder styrene butadiene rubber (SBR) were well mixed in deionized water to prepare a negative electrode slurry. The solid content in the negative electrode slurry was 30 wt %, and in the solid components, a mass ratio of graphite, Super P, CMC, and the binder styrene butadiene rubber (SBR) was 80:15:3:2. The negative electrode slurry was applied to a current collector copper foil and dried at 85° C., followed by cold pressing, trimming, cutting, slitting, and drying under a vacuum condition at 120° C. for 12 h, to prepare a negative electrode plate.

Preparation of Electrolyte

In an argon-filled glove box (water amount<10 ppm, oxygen amount<1 ppm), 2% vinylene carbonate was added to the organic solvent (EC:EMC=3W %:7W %) and mixed to uniformity, and then 0.30 wt % of an oligomer (Mw=5, 000 g/mol, P1=5, q1=3) was added based on a total weight of the electrolyte. 1-M $LiPF_6$ was slowly added to a non-aqueous organic solvent, and after lithium salt was completely dissolved, a target electrolyte was obtained.

Preparation of Lithium-Ion Battery

A polyethylene (PE) film with a thickness of 16 μm was used as a separator. The prepared positive electrode plate, separator, and negative electrode plate were stacked in order so that the separator was sandwiched between the positive electrode plate and the negative electrode plate for isolation, and then the stack was wound to obtain a bare cell. Tabs were welded. The bare cell was placed in an outer package. The prepared electrolyte was injected into the dried cell, followed by packaging, standing, formation, shaping, capacity testing, and the like to complete preparation of lithium-ion battery (the pouch lithium-ion battery has a thickness of 4.0 mm, a width of 60 mm, and a length of 140 mm).

Examples 2-16

These examples were the same as Example 1, except for the type of the positive electrode active material, the type of the doping element in the positive electrode active material, a percentage of the doping element in the positive electrode active material, and a percentage of an oligomer in the electrolyte in each example shown in Table 1.

Comparative Example 1

This comparative example was the same as Example 1, except that the doping percentage in the positive electrode active material was 0.02%, and the oligomer according to formula (I) was not added to the electrolyte.

TABLE 1

| | Positive electrode active material before doping | Doping element | Doping percentage W1 | Oligomer percentage W2 | W2/W1 |
|---|---|---|---|---|---|
| Example 1 | $Li[Ni_{0.8}Co_{0.1}Mn_{0.1}]O_2$ | Zr | 0.01% | 0.30% | 30.0 |
| Example 2 | $Li[Ni_{0.8}Co_{0.1}Mn_{0.1}]O_2$ | Zr | 0.10% | 0.30% | 3.0 |
| Example 3 | $Li[Ni_{0.8}Co_{0.1}Mn_{0.1}]O_2$ | Zr | 0.30% | 0.30% | 1.0 |
| Example 4 | $Li[Ni_{0.8}Co_{0.1}Mn_{0.1}]O_2$ | Zr | 0.50% | 0.30% | 0.6 |
| Example 5 | $Li[Ni_{0.9}Co_{0.05}Mn_{0.05}]O_2$ | B | 0.02% | 0.10% | 5.0 |
| Example 6 | $Li[Ni_{0.9}Co_{0.05}Mn_{0.05}]O_2$ | B | 0.02% | 0.50% | 25.0 |
| Example 7 | $Li[Ni_{0.9}Co_{0.05}Mn_{0.05}]O_2$ | B | 0.02% | 1% | 50.0 |
| Example 8 | $Li[Ni_{0.9}Co_{0.05}Mn_{0.05}]O_2$ | B | 0.02% | 5% | 250.0 |
| Example 9 | $Li[Ni_{0.9}Co_{0.05}Mn_{0.05}]O_2$ | B | 0.02% | 8% | 400.0 |
| Example 10 | $Li[Ni_{0.9}Co_{0.05}Mn_{0.05}]O_2$ | B | 0.02% | 10% | 500.0 |
| Example 11 | $Li[Ni_{0.8}Co_{0.1}Mn_{0.1}]O_2$ | Mg | 0.02% | 0.50% | 25.0 |
| Example 12 | $Li[Ni_{0.8}Co_{0.1}Mn_{0.1}]O_2$ | Al | 0.01% | 0.50% | 50.0 |
| Example 13 | $Li[Ni_{0.8}Co_{0.1}Mn_{0.1}]O_2$ | Zn | 0.01% | 0.50% | 50.0 |
| Example 14 | $Li[Ni_{0.5}Co_{0.2}Mn_{0.3}]O_2$ | B | 0.02% | 0.50% | 25.0 |
| Example 15 | $Li[Ni_{0.6}Co_{0.2}Mn_{0.2}]O_2$ | Mg | 0.01% | 0.50% | 50.0 |
| Example 16 | $Li[Ni_{0.7}Co_{0.2}Mn_{0.1}]O_2$ | Zr | 0.01% | 0.50% | 50.0 |
| Comparative example 1 | $Li[Ni_{0.9}Co_{0.05}Mn_{0.05}]O_2$ | Zr | 0.02% | / | / |

The lithium-ion batteries prepared in Examples 1-16 and Comparative example 1 were tested with the following methods.

(1) Thermal Box Performance Test of Lithium-Ion Battery

With the ambient temperature adjusted to 25° C., the lithium-ion battery was charged at 1 C to 4.2 V, charged at constant voltage to 0.05 C, and placed in a heating furnace. Then the furnace was heated at 10° C./min and held for 10 min until the lithium-ion battery experienced thermal runaway, indicating a stop of the process. When the lithium-ion battery experienced thermal runaway, the monitored temperature of the furnace was recorded.

(2) Cycling Performance Test of Lithium-Ion Battery

At 25° C., the lithium-ion battery was charged to 4.2 V at a constant current of 1 C, charged to a current of 0.05 C at a constant voltage of 4.2 V, and then discharged to 2.8 V at a constant current of 1 C. This was one charge and discharge cycle. Taking the capacity of the first discharge as 100%, the capacity retention rate of the lithium-ion battery after 500 cycles was calculated. Capacity retention rate (%) of the lithium-ion battery after 500 cycles=(discharge capacity at the $500^{th}$ cycle/first discharge capacity)×100%.

The test results of the lithium-ion batteries prepared in Examples 1-16 and Comparative example 1 were collected in Table 2.

TABLE 2

Test results of the lithium-ion batteries in Examples 1-16 and Comparative example 1

| | Cycling performance | Safety performance |
|---|---|---|
| Example 1 | 98.50% | 145° C. |
| Example 2 | 96.50% | 137° C. |
| Example 3 | 96.00% | 131° C. |
| Example 4 | 95.80% | 128° C. |
| Example 5 | 97.30% | 118° C. |
| Example 6 | 97.90% | 123° C. |
| Example 7 | 98.30% | 126° C. |
| Example 8 | 94.80% | 119° C. |
| Example 9 | 93.20% | 115° C. |
| Example 10 | 90.10% | 114° C. |
| Example 11 | 98.20% | 129° C. |

TABLE 2-continued

| Test results of the lithium-ion batteries in Examples 1-16 and Comparative example 1 | | |
|---|---|---|
| | Cycling performance | Safety performance |
| Example 12 | 98.50% | 131° C. |
| Example 13 | 98.40% | 132° C. |
| Example 14 | 99.20% | 150° C. |
| Example 15 | 98.70% | 145° C. |
| Example 16 | 98.40% | 141° C. |
| Comparative example 1 | 89.40% | 111° C. |

From the test results in Table 2, it can be seen that compared with Comparative example 1, Examples 1-16 of the present disclosure have achieved a certain degree of improvement in safety performance and cycling performance. This indicates that when the positive electrode active material includes a doping element, the electrolyte including a certain percentage of the oligomer according to formula (I) can effectively inhibit the dissolution of the doping element, improving the cycling performance and safety performance of the battery. In Comparative example 1, the positive electrode material includes a doping element, but the electrolyte does not include an oligomer that can have a complex reaction with the doping element, and HF in the electrolyte cannot be effectively removed. As a result, the dissolution of the doping element from the positive electrode material is severe, the positive electrode structure is damaged, and the doping element is deposited on the negative electrode, damaging the SEI film, which leads to the reductive decomposition of the electrolyte. Therefore, the safety performance and cycling performance of the cell are relatively poor.

Additionally, from the comparison between Examples 1-16, it can be seen that when the percentage of the doping element in the positive electrode active material and the percentage of the oligomer in the electrolyte satisfy a specific relationship, the dissolution of the doping element can be more significantly inhibited, thereby further improving the safety performance and cycling performance of the battery. For example, in Examples 9 and 10, the W2/W1 value exceeds 250, indicating that the percentage of the oligomer is relatively high, which results in an increase in the viscosity of the electrolyte, and therefore, the overall performance is poor. From the comparison between Examples 5-10, it can be seen that as a further specific W2/W1 value is selected, a battery with better cycling performance and safety performance can be obtained.

Although this application has been described with reference to the embodiments, various modifications can be made to this application without departing from the scope of this application and the components therein can be replaced with their equivalents. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A lithium-ion battery, comprising:

a positive electrode, a liquid electrolyte, and an additive, wherein a positive electrode active material comprised in the positive electrode comprises a doping element, the doping element comprises at least one selected from W, Cu, Fe, V, Cr, Ti, Zr, Zn, Al, In, Ta, Y, La, Sr, Ga, Sc, Gd, Sm, Ca, Ce, Nb, Mg, B, and Mo, a percentage W1 of the doping element based on a weight of the positive electrode active material satisfies 0.01%≤W1%≤0.5%, and the liquid electrolyte comprises an oligomer according to formula (I), (I)

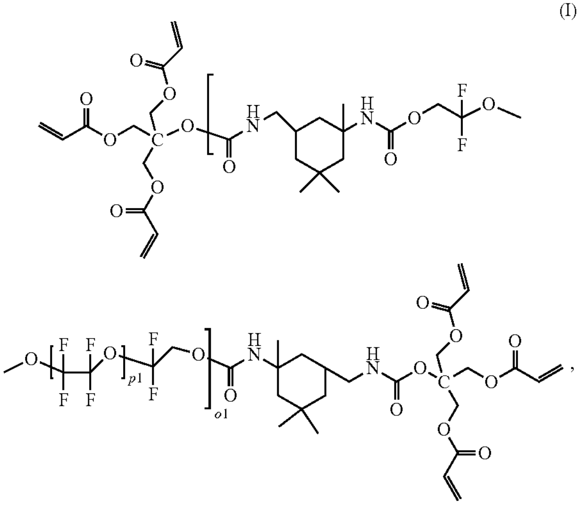

, wherein P1 and q1 are the numbers of repeated units, P1 is an integer from 1 to 10, and q1 is an integer from 1 to 15; a percentage W2 of the oligomer based on a total weight of the liquid electrolyte satisfies 5%≤W2≤10%; and a ratio of W2 to W1 satisfies 25≤W2/W1≤50; and wherein the additive comprises lithium triflate or lithium borate diacetate.

2. The lithium-ion battery according to claim 1, wherein the percentage W1 of the doping element is 0.01-0.4%.

3. The lithium-ion battery according to claim 1, wherein in formula (I), P1 is an integer from 2 to 8, and q1 is an integer from 2 to 10.

4. The lithium-ion battery according to claim 1, wherein the doping element comprises at least one selected from Mg, Al, Zr, and B.

5. The lithium-ion battery according to claim 1, wherein the positive electrode active material comprises a positive electrode active material according to the following formula:

$Li_x[Ni_yCo_zMn_w]O_2$, wherein 0.8≤x≤1.2, 0.5≤y<1, 0<z≤0.3, and 0<w≤0.3.

6. The lithium-ion battery according to claim 1, wherein a solvent in the liquid electrolyte comprises at least one selected from ethylene carbonate, propylene carbonate, dimethyl carbonate, diethyl carbonate, ethyl methyl carbonate, fluoroethylene carbonate, ethyl acetate, and ethyl propionate.

7. The lithium-ion battery according to claim 1, wherein lithium salt in the liquid electrolyte comprises at least one selected from $LiPF_6$ and lithium bis(fluorosulfonyl)imide.

8. The lithium-ion battery according to claim 1, further comprising:

a negative electrode, wherein a negative electrode active material comprised in the negative electrode comprises at least one selected from natural graphite, artificial graphite, mesocarbon microbeads, hard carbon, soft carbon, silicon, silicon-carbon composite, Li—Sn alloy, Li—Sn—O alloy, Sn, SnO, $SnO_2$, spinel structure lithiated $TiO_2$—$Li_4Ti_5O_{12}$, and Li—Al alloy.

9. The lithium-ion battery according to claim 1, wherein a surface of the positive electrode active material is coated with carbon.

10. The lithium-ion battery according to claim 1, wherein the additive has an amount of 0-5% by weight based on the total weight of the liquid electrolyte.

11. The lithium-ion battery according to claim 1, wherein the doping element comprises at least one selected from Cu, V, Cr, In, Ta, La, Ga, Sc, Gd, Sm, Nb, and Mo.

12. An electric apparatus, comprising the lithium-ion battery according to claim 1.

13. A lithium-ion battery, comprising:

a positive electrode and a liquid electrolyte, wherein a positive electrode active material comprised in the positive electrode comprises a doping element, the doping element comprises at least one selected from W, Cu, V, Cr, In, Ta, Y, La, Sr, Ga, Sc, Gd, Sm, Nb, and Mo, a percentage W1 of the doping element based on a weight of the positive electrode active material satisfies 0.01%≤W1%≤0.5%, and the liquid electrolyte comprises an oligomer according to formula (I), (I)

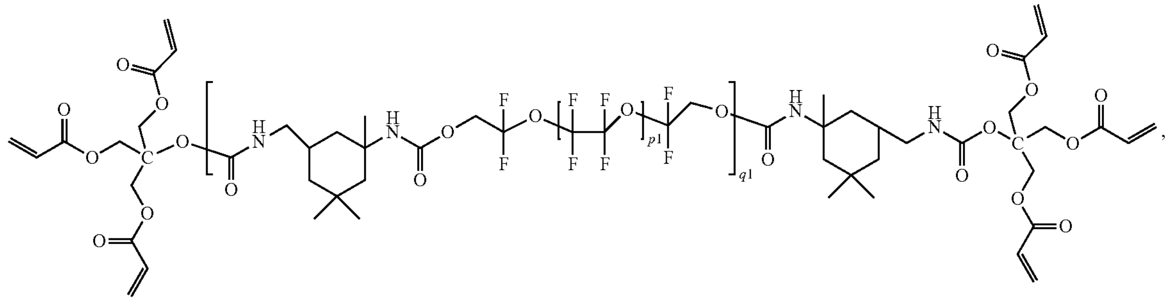

wherein P1 and q1 are the numbers of repeated units, P1 is an integer from 1 to 10, and q1 is an integer from 1 to 15; a percentage W2 of the oligomer based on a total weight of the liquid electrolyte satisfies 5%≤W2≤10%; and wherein the additive comprises lithium triflate or lithium borate diacetate.

14. A lithium-ion battery, comprising:

a positive electrode and an electrolyte, wherein a positive electrode active material comprised in the positive electrode comprises a doping element, the doping element comprises at least one selected from Cu, V, Cr, In, Ta, La, Ga, Sc, Gd, Sm, Nb, and Mo, a percentage W1 of the doping element based on a weight of the positive electrode active material satisfies 0.01%≤W1%≤0.5%, and the electrolyte comprises an oligomer according to formula (I), (I)

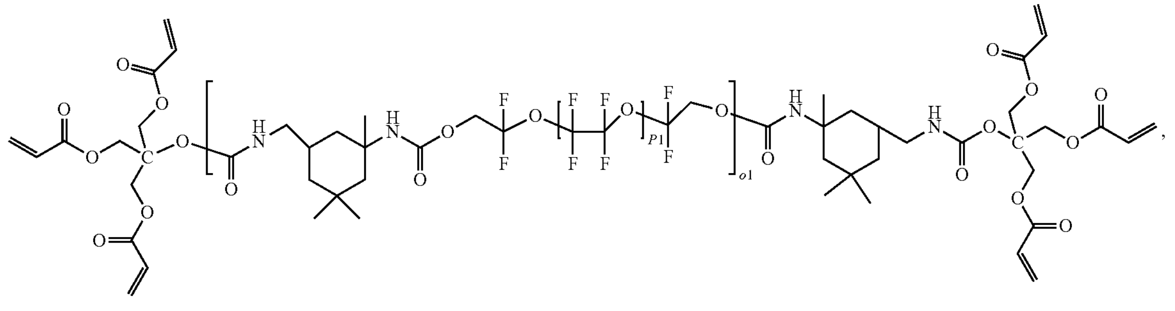

wherein P1 and q1 are the numbers of repeated units, P1 is an integer from 1 to 10, and q1 is an integer from 1 to 15; a percentage W2 of the oligomer based on a total weight of the electrolyte satisfies 0.1%≤W2≤10%; and a ratio of W2 to W1 satisfies 25≤W2/W1≤50.

* * * * *